B. C. MAGOON.
DOUGHNUT LIFTER.
APPLICATION FILED JAN. 6, 1916.
1,251,989. Patented Jan. 1, 1918.
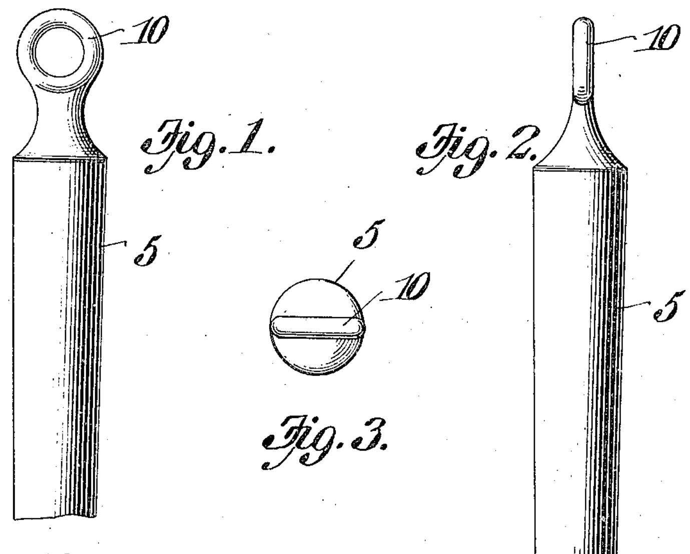
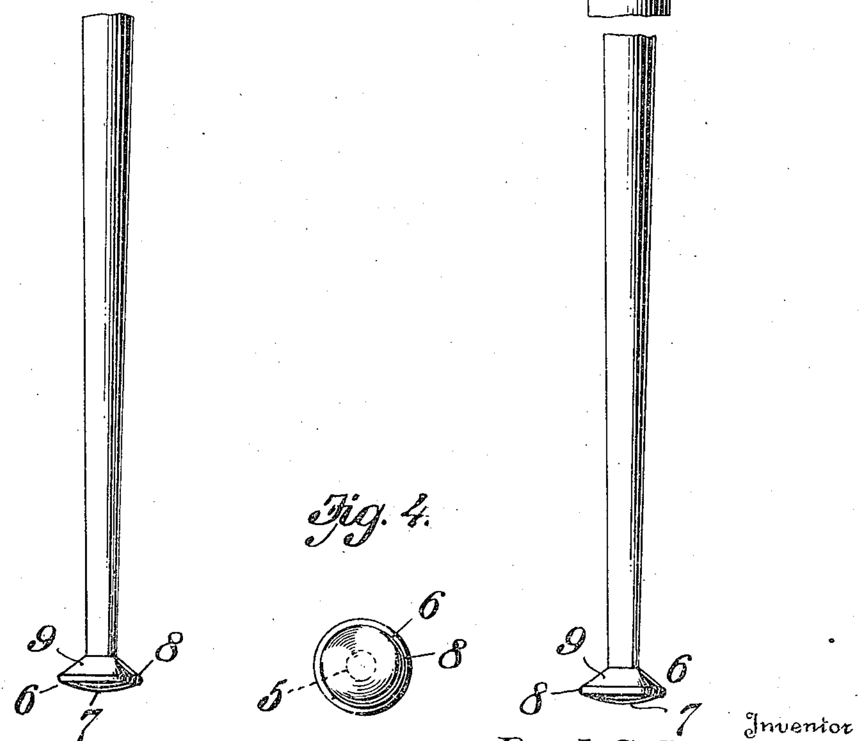
Witnesses
S. Friedman
A. B. Galt
Inventor
Bert C. Magoon.
By Perry N. Pattison
Attorney

UNITED STATES PATENT OFFICE.

BERT C. MAGOON, OF NEW CASTLE, NEW HAMPSHIRE.

DOUGHNUT-LIFTER.

1,251,989. Specification of Letters Patent. Patented Jan. 1, 1918.

Application filed January 6, 1916. Serial No. 70,633.

*To all whom it may concern:*

Be it known that I, Bert C. Magoon, a citizen of the United States, residing at New Castle, in the county of Rockingham and State of New Hampshire, have invented certain new and useful Improvements in Doughnut-Lifters, of which the following is a specification.

This invention relates generally to culinary implements, and particularly to implements for use in removing doughnuts from cooking utensils.

The primary object of the invention is to provide a doughnut lifter by means of which doughnuts, or other similar articles, may be with facility removed from the pan containing the same with the least possible danger of breaking or distorting the article.

A further object of the invention is to provide a device of the character described, by the use of which the hands of the cook are protected from splashing or spattering grease.

A still further object of the invention is to provide a device of the class mentioned which is simple in construction, which may be manufactured at extremely low cost, and which presents no crevices or interstices within which grease or other matter may collect, thus rendering the same easy to keep clean and thoroughly sanitary.

With these objects in view, together with others which will appear as the description proceeds, the invention resides in the novel combination and arrangement of parts all as will be described more fully hereinafter, illustrated in the drawings, and particularly pointed out in the claims.

The invention will be best understood by reference to the accompanying drawings, wherein—

Figure 1 is a side elevation of a doughnut lifter constructed in accordance with my invention,—Fig. 2 is a similar view of the device taken from a different angle,—Fig. 3 is a top plan view of the lifter,—and Fig. 4 is a bottom plan view of the device.

Referring more particularly to the drawings, 5 indicates a shank from which the improved doughnut lifter is formed; the said shank being preferably cast of a light, strong and durable but inexpensive metal, such, for instance, as aluminum, and being of a diameter at one end to be conveniently gripped and held in the hand of the cook or operator. The shank is tapered gradually toward its opposite end as shown, and is preferably enlarged as at 6 at the extremity of the said end to provide a button-like head. The outer face of the head 6 is preferably rounded or curved as at 7 so that when held in the hand with the head 6 in engagement with the bottom of a cooking utensil, the flange 8 provided upon the head will be spaced upwardly from the bottom of the pan. It will also be observed that the head 6 is connected with the tapered end of the shank 5 by an annular inclined wall 9.

The opposite end of the shank 5 may be provided with a suitable eye 10, by means of which the tool or implement may be conveniently hung or suspended from a hook.

The shank 5 is made of such length that when gripped by the hand with the headed end 6 inserted in the cooking utensil, the hand will be so far removed from the pan as to present the least opportunity or chance of boiling or bubbling grease within the pan spattering upon the hands of the cook. In use, the device is inserted through the opening of the doughnut or other article being cooked, and by reason of the flange 8 extending outwardly from the shank, the head may be readily engaged beneath the adjacent edges of the article to facilitate the ready lifting of the same from the utensil. The rounded undersurface 7 of the head enables the operator to rock the shank to facilitate the engagement of the flange 8 beneath the article, while the inclined annular wall 9 causes the article to ride slightly upwardly to rest upon the shank 5.

Particular attention is called to the particular shape and proportions of the shank. When engaged with the enlarged end thereof it should be particularly noted that the larger end thereof is of a size to be conveniently grasped by the hands of the operator and that this shank is materially reduced adjacent the button like head so that it will readily engage a doughnut or the like.

The elongated shank also permits of the dissipation of heat before reaching the hands of the cook, thereby enabling the device to be used continuously without danger of burning or heating the hand. It is also to be understood that I do not necessarily limit myself to the construction of the device of metal, but reserve the right to construct the device of wood or such other materials as I see fit.

I claim.

An implement for lifting doughnuts comprising an elongated tapering shank having an eye on its enlarged end, a head integral with the opposite end of said shank and of a diameter greater than that of the portion of the shank to which it is attached, an anular inclined face connecting the larger diameter of the integral head with the shank, a curved outer face on the annular head, a vertical annular wall connecting the curved outer face to the annular inclined face, the diameter of the shank at its larger end being of a size to be conveniently grasped by the hands of the operator and the diameter of the shank at its opposite end adjacent said head being of a size to engage a doughnut or the like whereby it can be lifted from a pan.

In testimony whereof I affix my signature in the presence of two witnesses.

BERT C. MAGOON.

Witnesses:
JENNIE H. HAYWOOD,
W. S. HAYWOOD.

Copies of this patent may be obtained for five cents each, by addressing the "Commissioner of Patents, Washington, D. C."